E. E. GREENLEY.
PIPE GRABBER.
APPLICATION FILED SEPT. 30, 1911.
1,036,220.
Patented Aug. 20, 1912.
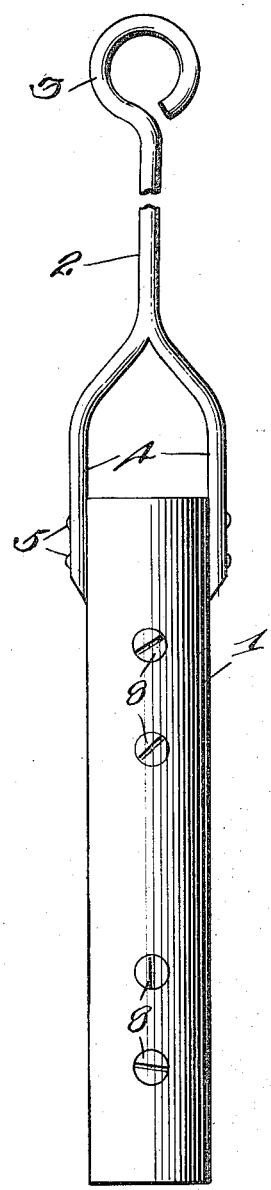
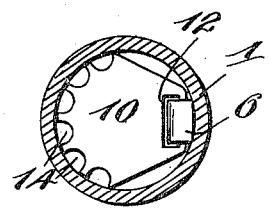
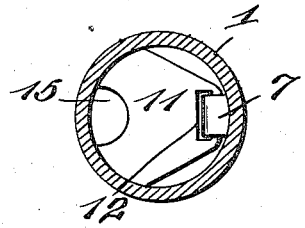
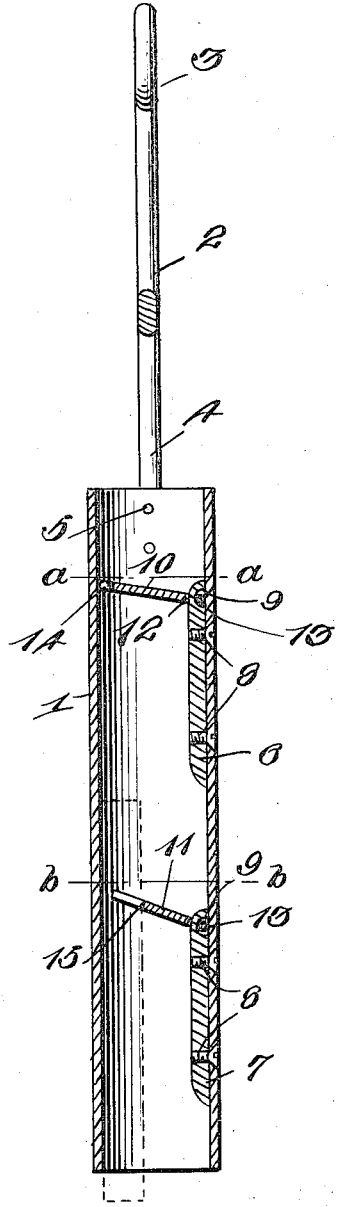
Inventor
E. E. Greenley,
Witnesses
Chas. L. Griesbauer.
L. G. Ellis.
By Watson E. Coleman.
Attorney

UNITED STATES PATENT OFFICE.

ELLIOTT E. GREENLEY, OF INDEPENDENCE, IOWA.

PIPE-GRABBER.

1,036,220. Specification of Letters Patent. Patented Aug. 20, 1912.

Application filed September 30, 1911. Serial No. 652,116.

*To all whom it may concern:*

Be it known that I, ELLIOTT E. GREENLEY, a citizen of the United States, residing at Independence, in the county of Buchanan and State of Iowa, have invented certain new and useful Improvements in Pipe-Grabbers, of which the following is a specification, reference being had to the accompanying drawings.

This invention is an improved pipe grabber especially adapted for use for grabbing a pipe, rod or the like, which may have become detached from a pump and dropped into a well, so as to enable the pipe or rod to be readily recovered, the invention consisting in the construction, combination and arrangement of devices hereinafter described and claimed.

The object of my invention is to provide a novel device of this character which is extremely cheap and simple, is very strong and durable, is not likely to get out of order, is extremely efficient in operation, and one in which the parts which are subject to wear or liable to be injured may be very readily detached and replaced by new ones or repaired at minimum cost.

In the accompanying drawings: Figure 1 is a side elevation of a pipe grabber constructed in accordance with my invention; Fig. 2 is a sectional view of the same on a plane at right angles to that of Fig. 1; Fig. 3 is a horizontal sectional view of the same on the plane indicated by the line *a—a* of Fig. 2; and Fig. 4 is a similar view on the plane indicated by the line *b—b* of Fig. 2.

The body 1 of my improved pipe grabber is tubular in form and is open at its upper and lower ends. The handle or operating rod 2 is here shown as provided at its upper end with an eye 3 which may serve as a hand-hold or as a means for attaching the implement to a chain or the like, and the rod 2 is provided at its lower end with a pair of fork arms 4 which are disposed astride the upper end of the tubular body, each of the fork arms being secured at its lower end to one side of the upper portion of the tubular body as at 5.

In practice, the tubular body is of such size that it is adapted to be lowered on to a pipe, rod or the like object which may have dropped in a well and which it is desired to recover. Within the tubular body and in one side of the same are a pair of bars 6 and 7, which are disposed longitudinally of the body and are secured, respectively, near the upper and lower ends thereof and to one side of the body by means of screws 8. Each of these bars is provided at its upper end, on the side next the wall of the tubular body to which it is secured, with a recess 9 which is closed by the adjacent wall of the tubular body. In connection with the bars 6 and 7 I also provide a pair of grabbing disks 10 and 11, respectively. These grabbing disks are substantially circular in form and each is provided at one side with an opening 12 through which the upper end of the bar extends, that portion of the side of the grabbing disk which forms the outer side of the said opening forming a pivot 13 which is disposed in the recess 9 and is held therein by the adjacent wall of the tubular body 1, which closes the outer side of the said recess. These grabbing disks are of such size that when they extend across the bore of the tubular body, they incline upwardly from the bars to which they are attached. In other words, the size of the grabbing disks is such that when they are closed in the tubular body, they are oblique to the axis thereof and incline toward the open, upper end thereof. The upper grabbing disk 12 is provided in its outer side with a series of semi-circular notches 14. The lower disk 11 is provided in its outer side with a substantially semi-circular recess 15, which is considerably larger than any of the recesses 14 of the disk 10. The disks are free to turn on their pivots 9 and when the device is in normal, upright position the grabbing disks, by their own weight, close against one side of the tubular body.

The operation of my invention is as follows: When it is desired to recover the pipe, rod or other similar object which has dropped into a well, my improved grabber is lowered and directed so that its tubular body passes downwardly around the upper end of the pipe or rod. The grabbing disks permit the body of the grabber to be freely lowered around and on the pipe or rod, but when the grabber is drawn upwardly the said disks, by their own gravity, close against the pipe or rod, thereby firmly catching the same and holding it securely between the grabbing disks and one side of the tubular body and enabling the pipe or rod to be readily drawn upwardly from the well. The recess 15 of the lower grabbing disk 11 is sufficiently large to receive one side of a pipe of considerable diameter. The recesses 14 of the upper grabbing disk 10 are smaller and are adapted for the reception of a smaller pipe or rod. The bar to which the grabbing disks are pivotally connected, being removable from the tubular body 1 by first removing the screws 8, enables the grabbing disks to be readily detached and to be repaired or replaced in the event that they should become worn or injured. Moreover, the construction of the co-engaging parts of the said bars and disks is such that the pivotal connection between the bars and disks is extremely simple as well as extremely strong.

Having thus described my invention I claim:

The herein described pipe grabber, comprising a tubular body open at its ends, means secured to the upper end of said body for suspending the same in a well or the like, and upper and lower grabbing disks pivotally mounted in the body in spaced relation to each other and of a size to engage the body with their free edges while in a slightly upwardly inclined position in the body, the lower disk being provided at its free edge with a single notch and the upper disk being formed in its free edge with a plurality of notches, all of which are smaller than the notch of the lower disk, the notches of the upper disk being arranged in an arcuate series.

In testimony whereof I hereunto affix my signature in the presence of two witnesses.

ELLIOTT E. GREENLEY.

Witnesses:
  LEO O'BRIEN,
  CATHERINE JEKEL.